(12) United States Patent
Kermiche et al.

(10) Patent No.: US 7,583,466 B2
(45) Date of Patent: Sep. 1, 2009

(54) DISK DRIVE DETERMINING OPERATING FLY HEIGHT BY DETECTING HEAD DISK CONTACT FROM DISK ROTATION TIME

(75) Inventors: Noureddine Kermiche, Mission Viejo, CA (US); Scott A. St. John, Trabuco Canyon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/940,894

(22) Filed: Nov. 15, 2007

(65) Prior Publication Data

US 2009/0128947 A1  May 21, 2009

(51) Int. Cl.
G11B 5/60  (2006.01)
(52) U.S. Cl. ........................................ 360/75
(58) Field of Classification Search ................. None
See application file for complete search history.

(56) References Cited

U.S. PATENT DOCUMENTS

| | | | |
|---|---|---|---|
| 5,130,866 A | 7/1992 | Klaassen et al. | |
| 5,297,131 A | 3/1994 | Tanaka | |
| 5,589,996 A * | 12/1996 | Patrick et al. ............. | 360/73.03 |
| 5,594,595 A * | 1/1997 | Zhu ............................. | 360/75 |
| 5,691,857 A | 11/1997 | Fitzpatrick et al. | |
| 5,742,446 A | 4/1998 | Tian et al. | |
| 5,751,512 A | 5/1998 | Anderson | |
| 5,761,165 A | 6/1998 | Takeda et al. | |
| 5,926,338 A | 7/1999 | Jeon et al. | |
| 5,978,168 A | 11/1999 | Mathews et al. | |
| 5,991,115 A | 11/1999 | Chainer et al. | |
| 5,998,994 A | 12/1999 | Mori | |
| 6,008,640 A | 12/1999 | Tan et al. | |
| 6,008,962 A | 12/1999 | Le et al. | |
| 6,014,283 A | 1/2000 | Codilian et al. | |
| 6,052,243 A | 4/2000 | Shimada | |
| 6,061,201 A | 5/2000 | Woods | |
| 6,067,205 A | 5/2000 | Mathews et al. | |
| 6,097,559 A | 8/2000 | Ottesen et al. | |
| 6,288,856 B1 | 9/2001 | Ottesen et al. | |
| 6,310,740 B1 | 10/2001 | Dunbar et al. | |
| 6,310,742 B1 | 10/2001 | Nazarian et al. | |
| 6,317,285 B1 | 11/2001 | Bi et al. | |
| 6,493,169 B1 | 12/2002 | Ferris et al. | |
| 6,510,017 B1 | 1/2003 | Abdelnour | |
| 6,568,252 B1 | 5/2003 | Boutaghou | |
| 6,657,810 B1 | 12/2003 | Kupferman | |

(Continued)

Primary Examiner—William J Klimowicz
Assistant Examiner—James L Habermehl
(74) Attorney, Agent, or Firm—Howard H. Sheerin, Esq.

(57) ABSTRACT

A disk drive is disclosed including a disk having a plurality of tracks, wherein each track comprises a plurality of data sectors and a plurality of servo sectors. The disk drive further comprises a spindle motor for rotating the disk, and a head actuated radially over the disk, wherein the head comprises a dynamic fly height (DFH) heater. Control circuitry within the disk drive is operable to select an operating control setting for the DFH heater by positioning the head over one of the tracks, measuring a first rotation time of the disk in response to at least one of the servo sectors, adjusting the control setting for the DFH heater, measuring a second rotation time of the disk in response to at least one of the servo sectors, and detecting whether the head has contacted the disk in response to the first and second rotation times.

23 Claims, 9 Drawing Sheets

U.S. PATENT DOCUMENTS

| | | |
|---|---|---|
| 6,687,078 B1 | 2/2004 | Kim |
| 6,700,724 B2 | 3/2004 | Riddering et al. |
| 6,717,764 B2 | 4/2004 | Lake |
| 6,754,025 B1 | 6/2004 | Shepherd et al. |
| 6,754,030 B2 | 6/2004 | Seng et al. |
| 6,762,899 B2 | 7/2004 | Ottesen et al. |
| 6,785,081 B2 | 8/2004 | Chapin et al. |
| 6,798,605 B2 | 9/2004 | Kurita et al. |
| 6,801,376 B2 | 10/2004 | Smith |
| 6,822,816 B2 | 11/2004 | Dakroub |
| 6,847,503 B2 | 1/2005 | Zhang et al. |
| 6,865,040 B2 | 3/2005 | Fayeulle et al. |
| 6,914,740 B1 | 7/2005 | Tu et al. |
| 6,947,248 B2 | 9/2005 | Allen et al. |
| 6,972,540 B1 | 12/2005 | Wang et al. |
| 6,980,383 B2 | 12/2005 | Brunnett et al. |
| 6,999,266 B1 | 2/2006 | Schmidt |
| 7,016,131 B2 | 3/2006 | Liu et al. |
| 7,038,875 B2 | 5/2006 | Lou et al. |
| 7,046,463 B2 | 5/2006 | Gay Sam et al. |
| 7,064,659 B2 | 6/2006 | Baumgartner et al. |
| 7,068,451 B1 | 6/2006 | Wang et al. |
| 7,068,457 B2 | 6/2006 | Riddering et al. |
| 7,095,578 B2 | 8/2006 | Ma |
| 7,099,108 B2 | 8/2006 | Zayas |
| 7,121,133 B2 | 10/2006 | Chu et al. |
| 7,124,625 B1 | 10/2006 | Kurita et al. |
| 7,126,776 B1 | 10/2006 | Warren, Jr. et al. |
| 7,136,248 B2 * | 11/2006 | Tanner .................... 360/73.03 |
| 7,139,149 B1 | 11/2006 | Sun et al. |
| 7,158,325 B1 | 1/2007 | Hu et al. |
| 7,180,692 B1 | 2/2007 | Che et al. |
| 7,199,961 B1 | 4/2007 | Wu et al. |
| 7,206,159 B2 | 4/2007 | White |
| 7,212,374 B1 | 5/2007 | Wang et al. |
| 7,251,098 B1 | 7/2007 | Wang et al. |
| 7,342,734 B1 | 3/2008 | Patapoutian et al. |
| 7,349,170 B1 * | 3/2008 | Rudman et al. ................ 360/75 |
| 7,359,139 B1 | 4/2008 | Wu et al. |
| 7,362,534 B1 * | 4/2008 | Schreck et al. ................ 360/75 |
| 7,551,390 B1 | 6/2009 | Wang et al. |
| 2002/0054446 A1 * | 5/2002 | Smith ....................... 360/73.03 |
| 2002/0063545 A1 * | 5/2002 | Bloyer et al. ................. 318/560 |
| 2002/0122267 A1 * | 9/2002 | Morioka ...................... 360/75 |
| 2002/0167745 A1 | 11/2002 | Ottesen et al. |
| 2003/0002183 A1 | 1/2003 | Fioravanti |
| 2003/0184899 A1 | 10/2003 | Gay Sam et al. |
| 2003/0193727 A1 | 10/2003 | Fioravanti et al. |
| 2003/0218813 A1 | 11/2003 | Dakroub |
| 2007/0047133 A1 | 3/2007 | Allen |
| 2007/0127148 A1 | 6/2007 | Yokohata et al. |
| 2007/0146920 A1 * | 6/2007 | Kitamura et al. .............. 360/75 |
| 2007/0188908 A1 * | 8/2007 | Kurita et al. ................... 360/75 |
| 2007/0291401 A1 * | 12/2007 | Sun et al. ....................... 360/75 |

* cited by examiner

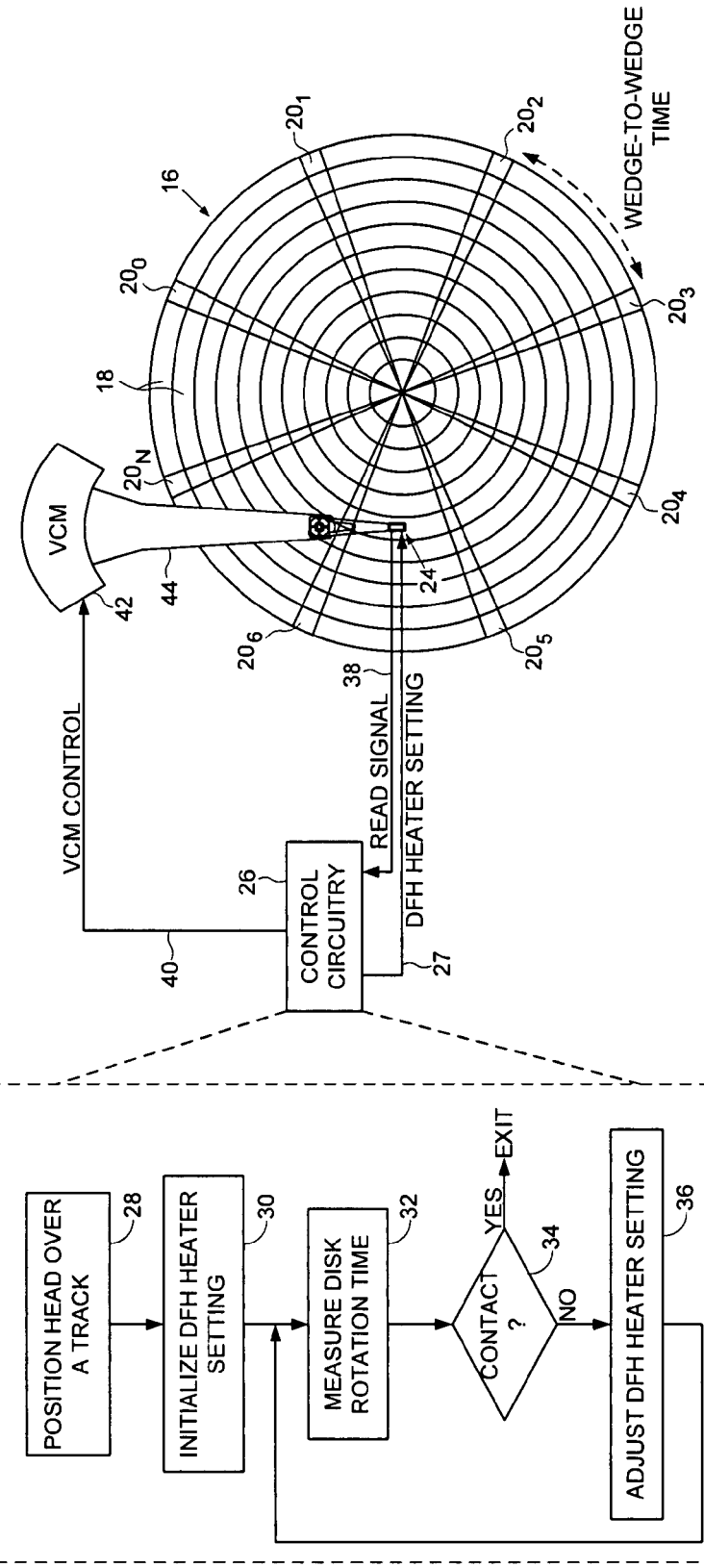

US 7,583,466 B2

DISK DRIVE DETERMINING OPERATING FLY HEIGHT BY DETECTING HEAD DISK CONTACT FROM DISK ROTATION TIME

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise a heater which controls the fly height through thermal expansion. It is therefore desirable to determine the appropriate heater power (e.g., appropriate current applied to the heater) that achieves the target fly height for the head.

BRIEF DESCRIPTION OF THE DRAWINGS

FIG. 2A shows a disk drive according to an embodiment of the present invention comprising a disk, a head actuated over the disk comprising a DFH heater, and control circuitry.

FIG. 2B is a flow diagram executed by the control circuitry for selecting an operating control setting for the DFH heater according to an embodiment of the present invention.

DETAILED DESCRIPTION OF EMBODIMENTS OF THE INVENTION

Figure 2C:
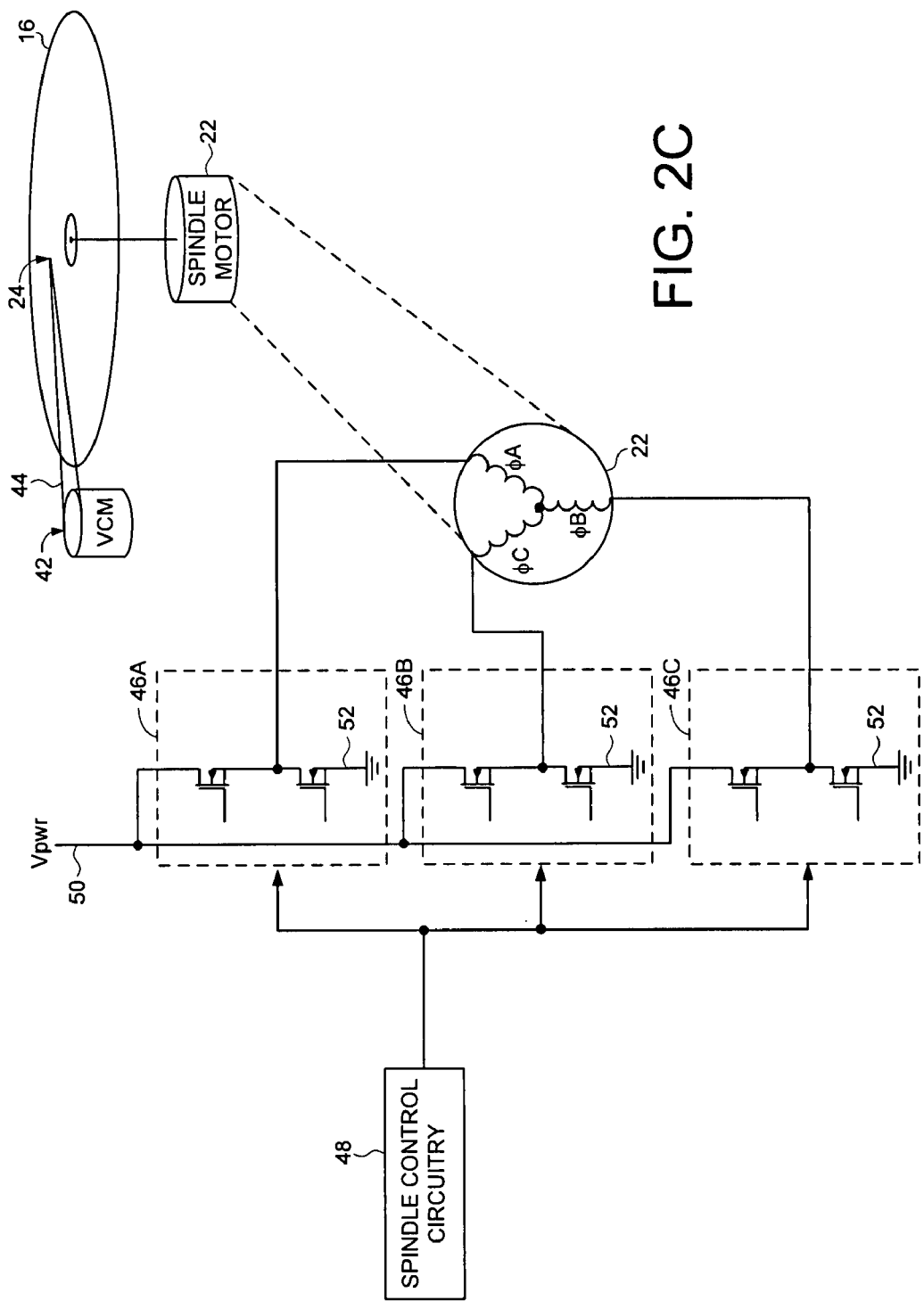
FIG. 2C shows a spindle motor and spindle control circuitry, including switches that in one embodiment are tristated during at least part of the DFH heater calibration procedure.

FIG. 2A shows an embodiment of the present invention comprising a disk drive including a disk 16 having a plurality of tracks 18, wherein each track comprises a plurality of data sectors and a plurality of servo sectors $20_0$-$20_N$. The disk drive further comprises a spindle motor 22 (FIG. 2C) for rotating the disk 16, and a head 24 actuated radially over the disk 16, wherein the head 24 comprises a dynamic fly height (DFH) heater. Control circuitry 26 within the disk drive is operable to select an operating control setting 27 for the DFH heater by executing the flow diagram of FIG. 2B. The head 24 is positioned over one of the tracks (step 28), the control setting of the DFH heater is initialized (step 30), and a first rotation time of the disk 16 is measured (step 32) in response to at least one of the servo sectors $20_0$-$20_N$. The control setting for the DFH heater is adjusted (step 36), and a second rotation time of the disk is measured (step 32) in response to at least one of the servo sectors $20_0$-$20_N$. The process repeats until the measured rotation times indicate that the head has contacted the disk (step 34).

In the embodiment of FIG. 2A, the control circuitry 26 processes the read signal 38 emanating from the head 24 to demodulate the embedded servo sectors $20_0$-$20_N$ and generate a position error signal (PES) representing a radial offset of the head 24 from a target track 18. The control circuitry 26 processes the PES with a suitable servo compensator to generate a control signal 40 applied to a voice coil motor (VCM) 42. The VCM 42 rotates an actuator arm 44 about a pivot in order to actuate the head 24 radially over the disk 16 in a direction that decreases the PES.

FIG. 2C shows an embodiment of the present invention wherein the control circuitry 26 comprises switches 46A-46C and spindle control circuitry 48 for driving the spindle motor 22. The spindle motor 22 comprises a plurality of windings, such as three windings φA, φB, φC in the example embodiment shown in FIG. 2C. Spindle control circuitry 48 configures the switches 46A-46C to connect the windings to either a supply voltage 50 or ground 52 according to a suitable commutation sequence. In an embodiment described in more detail below, the switches 46A-46C may be tristated so as to tristate the windings so that they are not connected to the supply voltage 50 or ground 52 during at least part of the DFH heater calibration process.

In one embodiment, the control circuitry 26 measures the rotation time by measuring at least one wedge-to-wedge (WTW) time. One WTW time may equal the interval between two consecutive servo sectors $20_0$-$20_N$ as shown in FIG. 2A or it may equal the time interval between more than one servo sectors $20_0$-$20_N$. In one embodiment, the WTW time is measured relative to an open loop frequency as a number of clock cycles between the servo sync marks detected in two consecutive servo sectors $20_0$-$20_N$. In an alternative embodiment, the WTW time may be measured relative to a closed loop frequency (e.g., a phase-locked loop (PLL)) which is synchronized to the angular velocity of the disk. For example, the WTW time may be measured by evaluating (e.g., integrating) the control signal applied to a PLL which attempts to maintain a constant number of clock cycles between consecutive servo sync marks. As the angular velocity of the disk changes, the PLL control signal adjusts accordingly, and therefore the WTW time may be measured by adding the integrated PLL control signal to the center frequency control signal of the PLL.

The disk rotation time may be measured in any suitable manner relative to the measured WTW time. For example, in one embodiment the disk rotation time may be measured relative to each consecutive WTW time during a current disk revolution which assumes a substantially equal spacing between consecutive servo sectors. In another embodiment, the disk rotation time may be measured relative to the same WTW time measured over multiple disk revolutions for the same two consecutive servo sectors.

Figure 3:
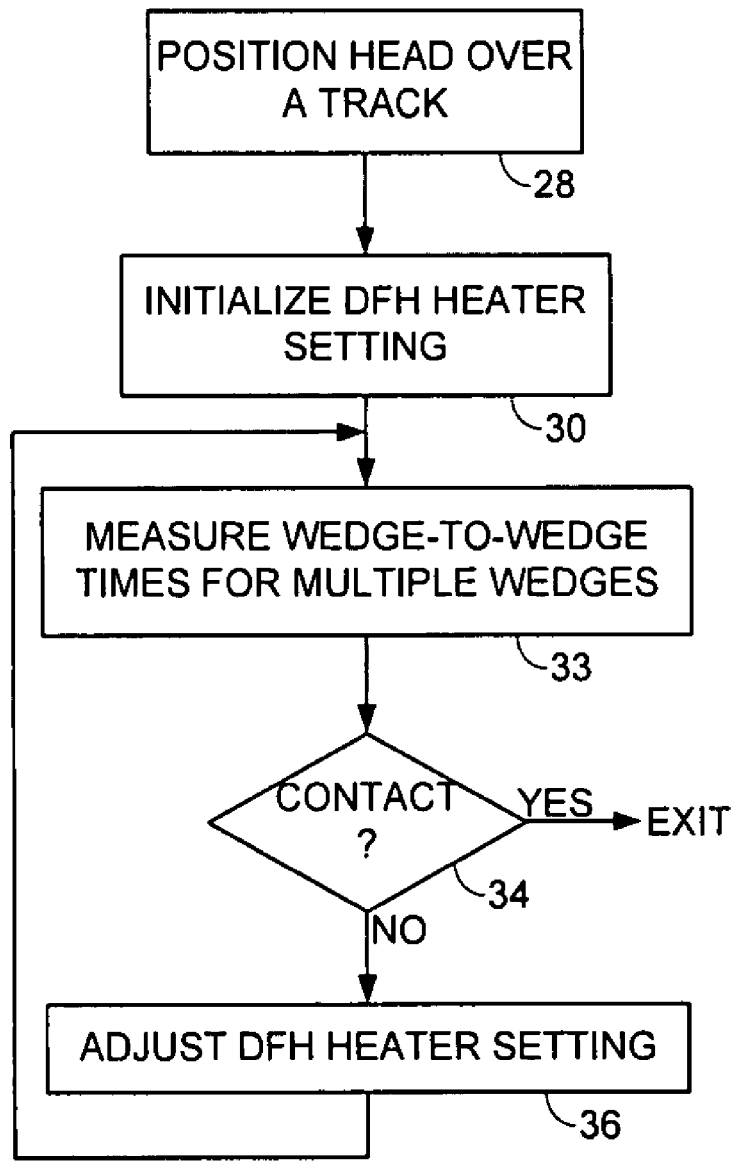
FIG. 3 shows a flow chart executed by the control circuitry wherein wedge-to-wedge times are measured in order to select the operating setting for the DFH heater according to an embodiment of the present invention.

FIG. 3 shows a flow chart executed by the control circuitry 26 according to an embodiment of the present invention wherein the disk rotation time is measured by measuring a plurality of WTW times (step 33). For example, in one embodiment a number of consecutive WTW times are measured as described above, wherein each WTW time provides an indication of disk rotation time. In another embodiment, a number of WTW times (e.g., every two WTW times) may be accumulated into a single measurement that represents the measured disk rotation time.

Figure 4A:
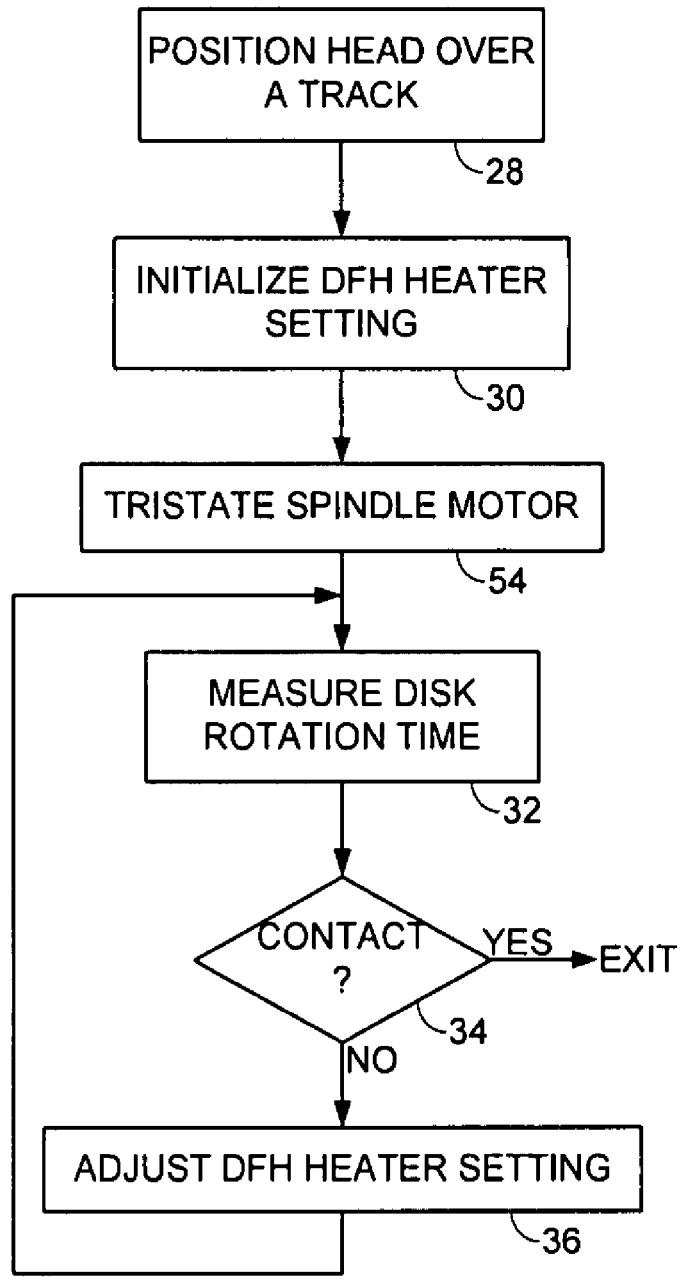
FIG. 4A shows a flow diagram executed by the control circuitry wherein the spindle motor is tristated while measuring the wedge-to-wedge times according to an embodiment of the present invention.

FIG. 4A shows a flow diagram executed by the control circuitry 26 according to an embodiment of the present invention wherein the spindle motor 22 is tristated (step 54) while measuring the disk rotation time (step 32) according to an embodiment of the present invention. In one embodiment, tristating the spindle motor comprises tristating (opening) the switches 46A-46C that drive the spindle motor windings so that the windings are floating (not connected to the supply voltage or ground).

Figure 4B:
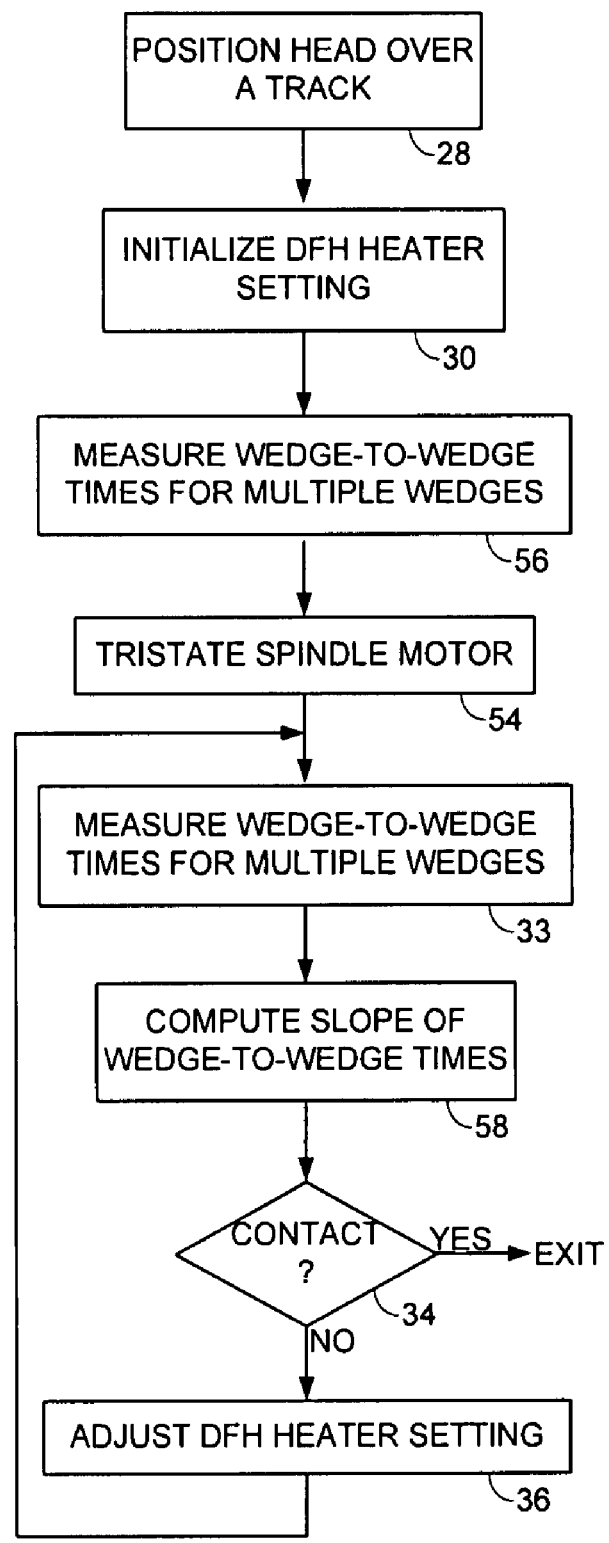
FIG. 4B shows a flow diagram executed by the control circuitry wherein a slope of the wedge-to-wedge times is computed to detect head disk contact according to an embodiment of the present invention.
Figure 5A:
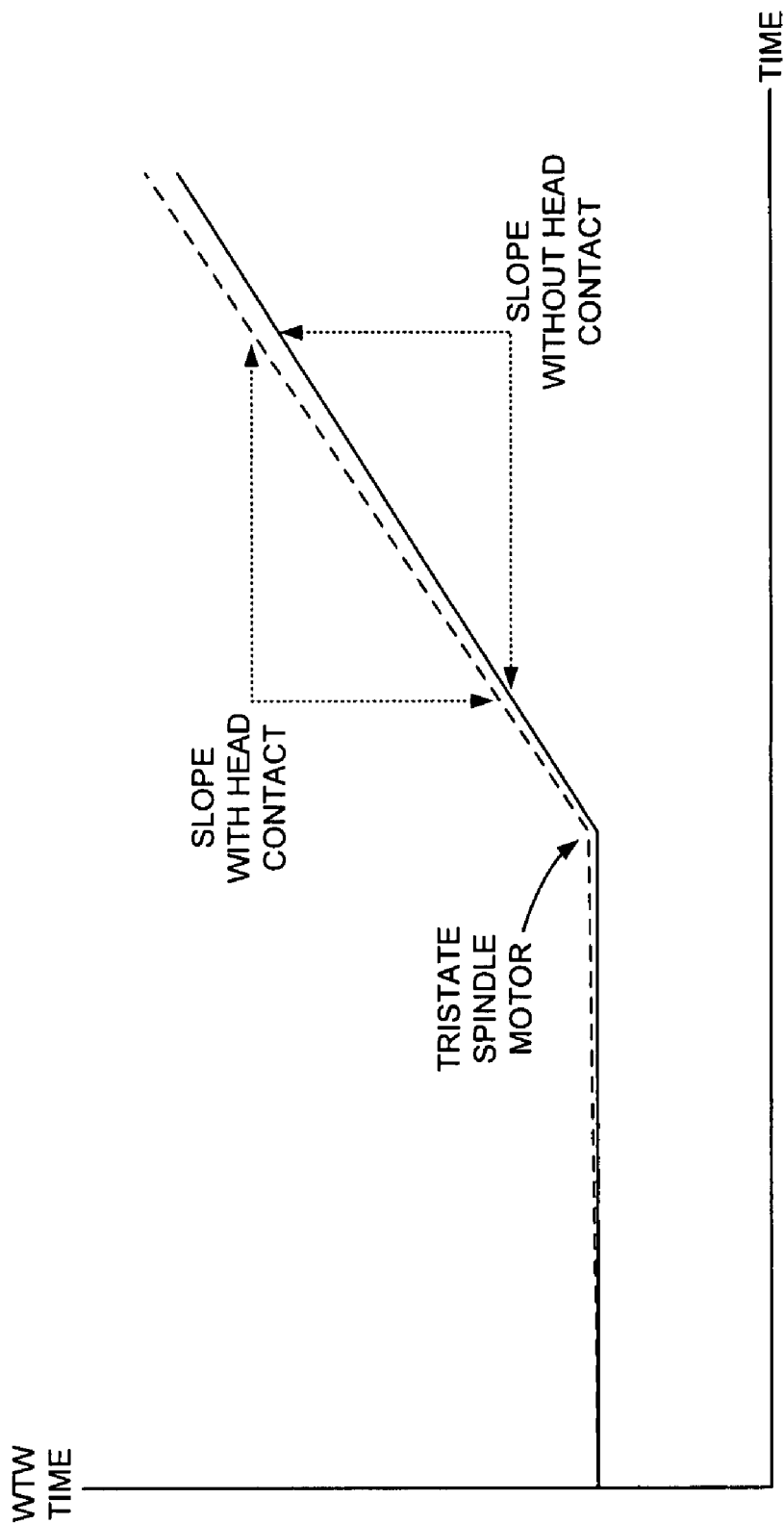
FIG. 5A illustrates an exemplary slope of wedge-to-wedge times with and without the head contacting the disk according to an example of an embodiment of the present invention.

FIG. 4B shows a flow diagram executed by the control circuitry wherein a slope of the disk rotation times (e.g., WTW times) is computed to detect the head disk contact according to an embodiment of the present invention. First a number of WTW times are measured to generate a baseline (step 56), the spindle motor is tristated (step 54), and a number of WTW times is again measured (step 33). The slope of the WTW times is then computed (step 58) wherein in one embodiment the head disk contact is detected (step 34) when the slope of the WTW times exceeds a threshold. An example of this embodiment is illustrated in FIG. 5A, which shows the WTW time increasing after tristating the spindle motor. When the control setting for the DFH heater is adjusted to the point where the head is contacting the disk, the slope of the WTW times increases as shown in FIG. 5A.

Figure 5B:
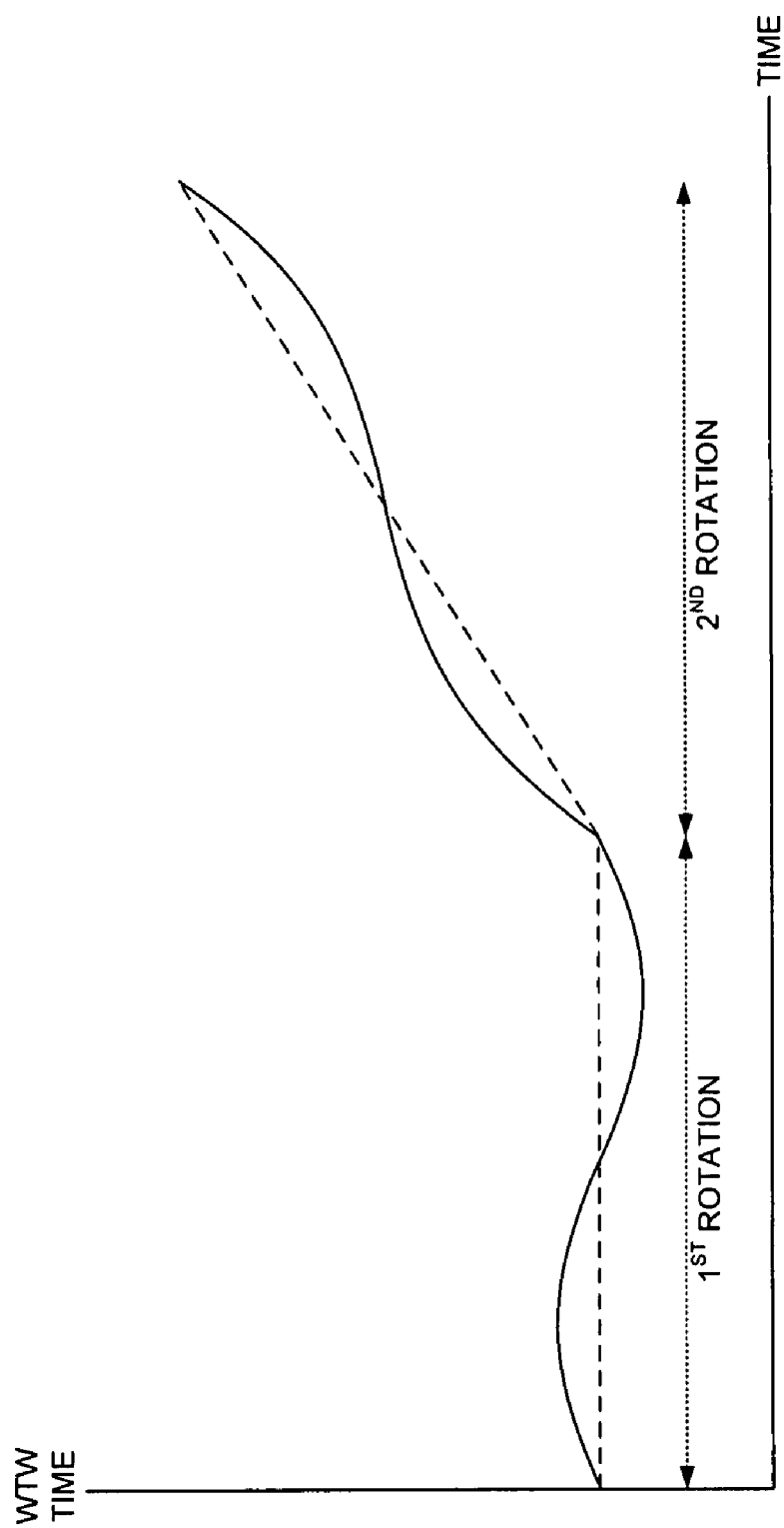
FIG. 5B illustrates an example of wedge-to-wedge times comprising a sinusoidal component due to repeatable runout of the disk according to an embodiment of the present invention.

In one embodiment, the WTW times may comprise a sinusoidal component due to a repeatable runout of the disk 16. Repeatable runout is caused by eccentricity in the disk rotating due, for example, to eccentricity in writing the servo sectors $20_0$-$20_N$ to the disk 16, or the non-centric alignment of the disk 16 when clamped to the spindle motor 22. An example of the sinusoidal component of the disk rotation times (e.g. WTW times) is illustrated in FIG. 5B wherein the dashed line represents no repeatable runout and the solid line represents the WTW times with repeatable runout. In one embodiment, the WTW times are measured over two rotations of the disk for each DFH heater control setting, wherein during the first rotation the spindle motor 22 is driven, and during the second rotation the spindle motor 22 is tristated. In one embodiment, the WTW time measurements begin at the same servo sector at the start of each rotation so that the sinusoidal component is the same for each disk rotation as shown in FIG. 5B. In this manner, the sinusoidal component in the WTW time can be compensated when computing the slope of the WTW times. For example, in one embodiment a curve fitting algorithm may be employed to find the best fit line through the sinusoid (e.g., the dashed line in FIG. 5B) in order to compute the slope of the WTW times.

Figure 6:
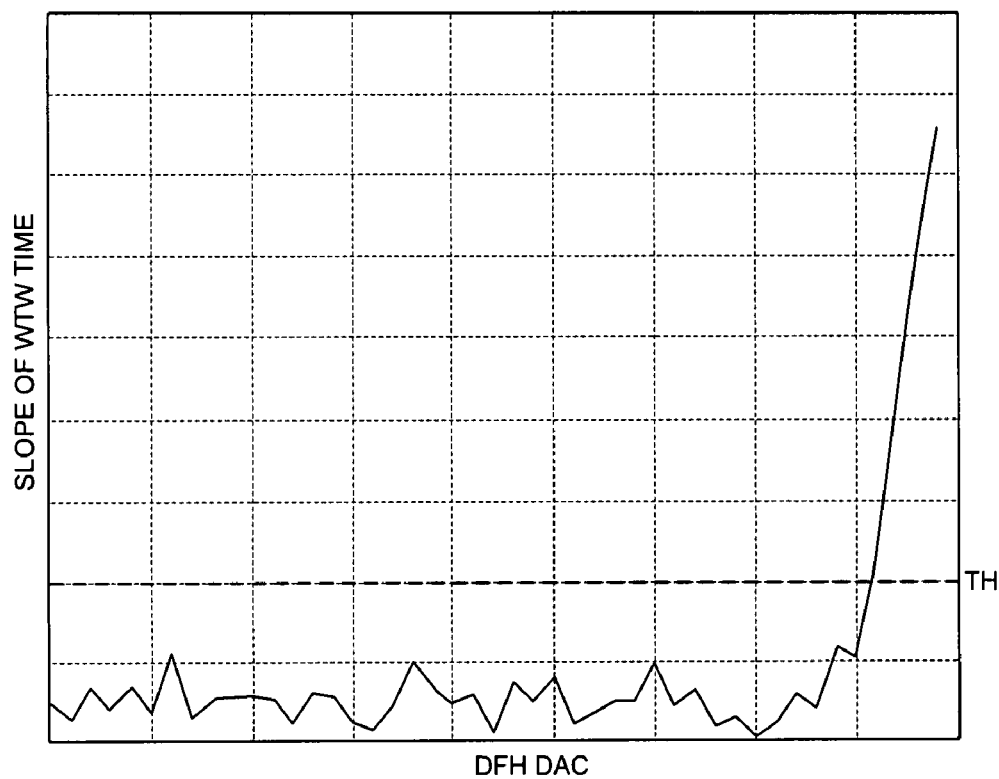
FIG. 6 is an exemplary graph showing the slope of wedge-to-wedge times versus the DFH heater control setting wherein the head disk contact is detected when the slope exceeds a threshold according to an embodiment of the present invention.

FIG. 6 is an exemplary graph of the slope of the WTW times versus the DFH heater control setting wherein the head disk contact is detected when the slope of the WTW times exceeds a threshold according to an embodiment of the present invention. The x-axis of the example in FIG. 6 represents the control setting for the DFH heater in terms of digital-to-analog converter (DAC) setting. The DAC setting is initialized (step 30 of FIG. 4B) at the left side of the x-axis and the slope of the WTW time is computed for the second of two disk revolutions. The DAC setting is then adjusted (step 36 of FIG. 4B) and a corresponding slope of the WTW times is computed for the second of two disk revolutions. This process repeats until the slope of the WTW times exceeds a threshold as shown in the example in FIG. 6.

Any suitable threshold for detecting the head disk contact may be employed in the embodiments of the present invention. For example, the threshold may be selected high enough to account for noise in the WTW time measurement, but low enough to minimize damage to the head due to the head disk contact. Alternatively, in one embodiment the threshold may be selected relative to a suitable variance measurement, such as a suitable sigma (e.g., three-sigma). In another embodiment, once the control setting for the DFH heater that results in head disk contact is detected, the operating control setting for the DFH heater may be selected according to a suitable margin away from the setting that resulted in the head disk contact.

Figure 1:
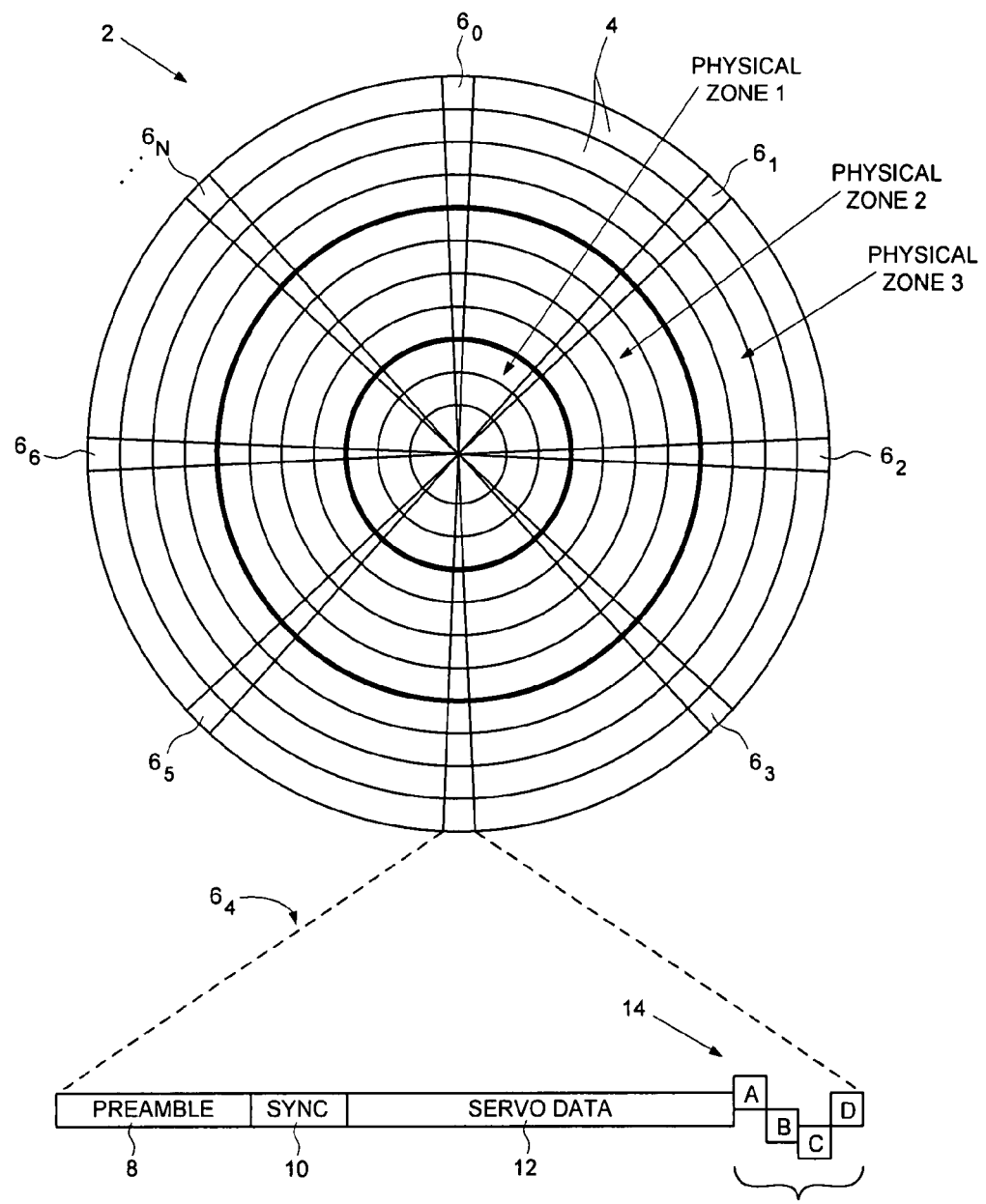
FIG. 1 shows a prior art disk format comprising a plurality of tracks, wherein each track comprises a plurality of data sectors and a plurality of servo sectors.

In one embodiment, the control circuitry 26 selects an operating control setting for the DFH heater for different radial locations of the head 24. For example, the control circuitry 26 may select an operating control setting for a first track and a second track, wherein the second track is separated radially from the first track by a predetermined number of tracks. In one embodiment, the disk comprises a plurality of zones (such as the physical zones shown in FIG. 1), wherein the first track is in a first zone and the second track is in a second zone.

Any suitable control circuitry 26 may be employed in the embodiments of the present invention, such as any suitable integrated circuit or circuits. For example, the control circuitry 26 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 26 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 26 comprises suitable logic circuitry, such as state machine circuitry.

What is claimed is:

1. A disk drive comprising:
a disk comprising a plurality of tracks, wherein each track comprises a plurality of data sectors and a plurality of servo sectors;
a spindle motor for rotating the disk;
a head actuated radially over the disk, wherein the head comprises a dynamic fly height (DFH) heater; and
control circuitry operable to select an operating control setting for the DFH heater by:
positioning the head over one of the tracks;
measuring a first rotation time of the disk in response to at least one of the servo sectors;
adjusting the control setting for the DFH heater;
measuring a second rotation time of the disk in response to at least one of the servo sectors; and
detecting whether the head has contacted the disk in response to the first and second rotation times.

2. The disk drive as recited in claim 1, wherein measuring the first and second rotation times comprises measuring a wedge-to-wedge time representing a time period between two of the servo sectors.

3. The disk drive as recited in claim 2, wherein the wedge-to-wedge time is measured by evaluating a control signal applied to a phase-locked loop.

4. The disk drive as recited in claim 2, wherein measuring the first and second rotation times comprises measuring multiple wedge-to-wedge times for multiple of the servo sectors.

5. The disk drive as recited in claim 1, wherein the disk rotation time comprises a sinusoidal component and the control circuitry is further operable to compensate for the sinusoidal component.

6. The disk drive as recited in claim 1, wherein the control circuitry comprises switches for driving the spindle motor, and the control circuitry is further operable to tristate the switches while measuring the first and second rotation times.

7. The disk drive as recited in claim 6, wherein measuring the first and second rotation times comprises computing a slope of the rotation times.

8. The disk drive as recited in claim 7, wherein detecting whether the head has contacted the disk comprises comparing the slope of the rotation times to a threshold.

9. The disk drive as recited in claim 1, wherein the control circuitry is further operable to select the operating control setting for the DFH heater in response to the adjusted control settings.

10. The disk drive as recited in claim 1, wherein the control circuitry is further operable to select at least two different operating control settings for the DFH heater corresponding to at least a first track and a second track.

11. The disk drive as recited in claim 10, wherein:
the tracks form a plurality of zones on the disk;
the first track is in a first zone; and
the second track is in a second zone.

12. A method of operating a disk drive, the disk drive comprising a disk comprising a plurality of tracks, wherein each track comprises a plurality of data sectors and a plurality of servo sectors, a spindle motor for rotating the disk, and a head actuated radially over the disk, wherein the head comprises a dynamic fly height (DFH) heater, the method comprising:
positioning the head over one of the tracks;
measuring a first rotation time of the disk in response to at least one of the servo sectors;
adjusting the control setting for the DFH heater;
measuring a second rotation time of the disk in response to at least one of the servo sectors; and
detecting whether the head has contacted the disk in response to the first and second rotation times.

13. The method as recited in claim 12, wherein measuring the first and second rotation times comprises measuring a wedge-to-wedge time representing a time period between two of the servo sectors.

14. The method as recited in claim 13, wherein the wedge-to-wedge time is measured by evaluating a control signal applied to a phase-locked loop.

15. The method as recited in claim 13, wherein measuring the first and second rotation times comprises measuring multiple wedge-to-wedge times for multiple of the servo sectors.

16. The method as recited in claim 12, wherein the disk rotation time comprises a sinusoidal component, further comprising compensating for the sinusoidal component.

17. The method as recited in claim 12, wherein the disk drive further comprises switches for driving the spindle motor, and further comprising tristating the switches while measuring the first and second rotation times.

18. The method as recited in claim 17, wherein measuring the first and second rotation times comprises computing a slope of the rotation times.

19. The method as recited in claim 18, wherein detecting whether the head has contacted the disk comprises comparing the slope of the rotation times to a threshold.

20. The method as recited in claim 12, further comprising selecting the operating control setting for the DFH heater in response to the adjusted control settings.

21. The method as recited in claim 12, further comprising selecting at least two different operating control settings for the DFH heater corresponding to at least a first track and a second track.

22. The method as recited in claim 21, wherein:
the tracks form a plurality of zones on the disk;
the first track is in a first zone; and
the second track is in a second zone.

23. A disk drive comprising:
a disk comprising a plurality of tracks, wherein each track comprises a plurality of data sectors and a plurality of servo sectors;
a spindle motor for rotating the disk;

a head actuated radially over the disk, wherein the head comprises a dynamic fly height (DFH) heater; and a means for positioning the head over one of the tracks;

a means for measuring a first rotation time of the disk in response to at least one of the servo sectors;

a means for adjusting the control setting for the DFH heater;

a means for measuring a second rotation time of the disk in response to at least one of the servo sectors; and a means for detecting whether the head has contacted the disk in response to the first and second rotation times.

* * * * *